May 12, 1959 D. M. FERGUSON 2,886,263
HIGH ALTITUDE BALLOON FOR METEOROLOGICAL USE

Filed Feb. 10, 1956 3 Sheets-Sheet 1

INVENTOR.
DONALD M. FERGUSON
BY Wade Loomis
Kasper T. Serijan AND
ATTORNEYS

May 12, 1959 D. M. FERGUSON 2,886,263
HIGH ALTITUDE BALLOON FOR METEOROLOGICAL USE
Filed Feb. 10, 1956 3 Sheets-Sheet 2
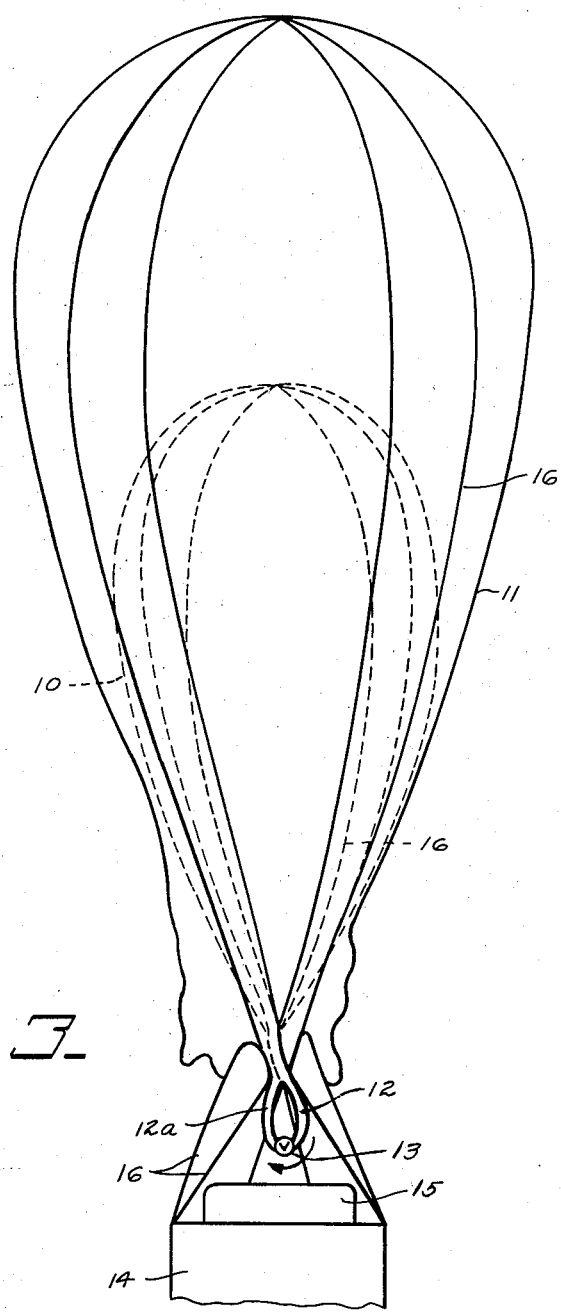
INVENTOR.
DONALD M. FERGUSON May 12, 1959  D. M. FERGUSON  2,886,263
HIGH ALTITUDE BALLOON FOR METEOROLOGICAL USE
Filed Feb. 10, 1956  3 Sheets-Sheet 3
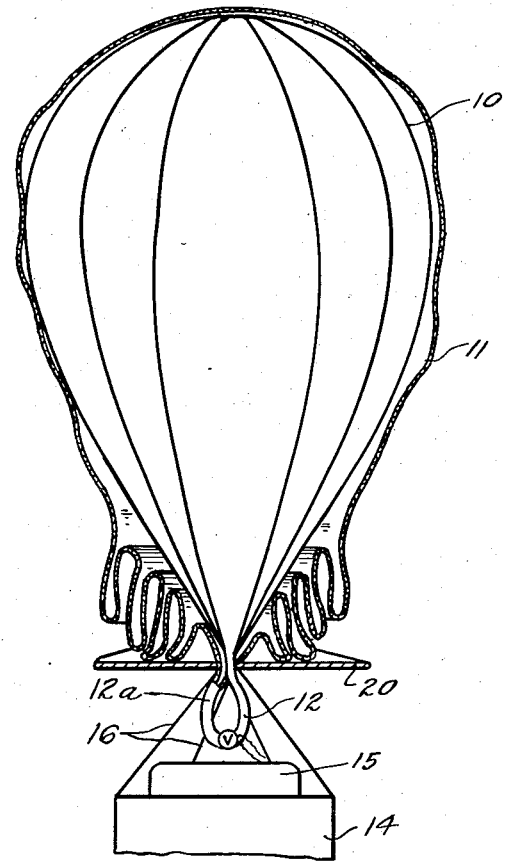
FIG_4
INVENTOR.
DONALD M. FERGUSON
BY
ATTORNEYS United States Patent Office 2,886,263
Patented May 12, 1959

2,886,263

HIGH ALTITUDE BALLOON FOR METEOROLOGICAL USE

Donald M. Ferguson, Marblehead, Mass., assignor to the United States of America as represented by the Secretary of the Air Force Application February 10, 1956, Serial No. 564,836

8 Claims. (Cl. 244—31)

(Granted under Title 35, U.S. Code (1952), sec. 266)

The invention described herein may be manufactured and used by or for the United States Government for governmental purposes without payment to me of any royalty thereon.

This invention relates to high altitude balloons and relates more particularly to stratospheric balloons adapted for facilitating the launching of equipment essential for meteorological investigations.

The conventional or classical type balloon has long been used for elevating meteorological instruments as, for example, instruments for continuously measuring atmospheric data, radio telemetering equipment for relaying data to ground stations and recording equipment for making a permanent record of the atmospheric data throughout the flight of the balloon. In its normal use, the sealed elastic envelope is charged with a lighter-than-air gas such as hydrogen or helium and launched, the unit slowly ascending while continuing its flight. As the atmosphere becomes rarer, the reduction in pressure causes the balloon to expand until eventually its elastic limit is reached and the balloon bursts. At this point, the parachute automatically takes charge and the instrument descends to earth.

Increasing weight loads created by continuing developments in meteorological instrumentation and the desire to elevate the equipment to higher and higher altitudes have imposed heavy demands upon balloon requirements, it becoming necessary that they be larger and lighter and sufficiently durable for prolonged periods of operation. It is readily seen that by enlarging the envelope, the lifting power will be increased more and more, and with it, the altitude that the balloon will be capable of attaining prior to reaching an equilibrium condition.

In connection with the relatively large balloons suitable for high altitude flight, launching difficulties have become particularly pronounced, it being essential that only a small amount of gas be initially charged to the balloon to prevent its rupturing prematurely. With only a small quantity of gas within the balloon occupying the upper part thereof, the whole lower part of the envelope is flabby until distended during the ascent. The fact that the sealed envelope is only partially filled at the time of launching has meant that the portion of the balloon which is filled with gas must rise usually from 45 to 75 feet before the meteorological instruments are lifted above the ground. While this is feasible in still air, launching has not often been successful in winds over 10 miles per hour because the instruments are frequently dragged along the ground resulting in extensive damage before the balloon rises the necessary distance to lift the same clear of the ground.

Although venting devices such as a pressure-actuated valve or the like may be provided for releasing some of the gas at the higher altitudes to the atmosphere and thereby permitting more gas to be initially charged within the balloon, this expedient is not satisfactory since loss of the lifting gas precludes the ascent of the unit to extremely high altitudes otherwise attainable within the elastic limits of the balloon.

For overcoming launching difficulties associated with high altitude balloons, attempts have been made to shield the balloon with a high wind screen consisting essentially of telephone poles, boards, and guy-wires. This approach to the problem has not proven very satisfactory since semipermanent installations are involved requiring considerable expense. Attempts have also been made to reel up the balloon on a launching device which is designed to close-couple the gas filled portion of the balloon and the instruments so that they will be promptly lifted from the ground when the balloon is released, after which the reel slowly unwinds the balloon and releases it in the air. This latter system inherently involves lifting approximately 100 pounds of additional weight at the time of launching.

It has now been discovered that by modifying the balloon structure to provide for the inclusion of a relatively small inner balloon within the envelope comprising the conventional high altitude balloon, the aforesaid launching difficulties are avoided to the extent that the requirement of fixed launching sites or heavy launching devices can be eliminated. This is accomplished by utilizing substantially all of the initially-charged lifting gas to fully inflate the inner envelope, the size of which should be sufficient providing the prerequisite buoyancy for launching the assembly. By close-coupling the load made possible by shortening the load harness connecting the equipment to be carried aloft to the envelopes, it has been found that successful launching may be achieved without any serious difficulty or instrument damage even in relatively heavy winds. With the provision of means between the envelopes for permitting the gradual transfer of the initially-charged lifting gas from the inflated inner envelope to the initially-deflated and surrounding outer envelope during ascension of the balloon, preferably by the operation of a pressure-actuated valve, the resulting expansion of the lifting gas within the envelopes enables the balloon to rise to higher and higher altitudes. By utilizing the limited amount of lifting gas that can be initially charged to the envelope in the aforesaid manner, the improved buoyancy and handling characteristics made possible thereby are of particular significance for facilitating launching high altitude balloons in accordance with the purpose of the present invention.

It is accordingly an object of this invention to provide a free-flying high altitude balloon adapted for elevating meterological instruments without incurring a serious risk of damaging the same during launching of the assembly.

It is another object of this invention to provide a free-flying high altitude balloon which is capable of launching a load of meterological instruments in even relatively heavy winds without resorting to the use of fixed launching sites or heavy launching devices.

It is a further object of this invention to provide a novel method for launching a high altitude meteorological balloon whereby difficulties such as ground drag resulting in damage to expensive instruments carried by the balloon may be greately reduced.

Other objects and advantages will become apparent as this specification proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the basic concept of the invention may be employed.

This invention will be described with reference to the drawings in which corresponding numerals refer to the same parts and in which.

Fig. 3 is an elevational view of the high altitude meteorological balloon in flight showing the lifting gas within the inner envelope being transferred to the outer envelope, the latter being shown in a substantially inflated condition; and Fig. 4 is an elevational view of another embodiment partly in section illustrating the utilization of a disc on which the folds of the uninflated envelope may be supported initially.

Figure 1:
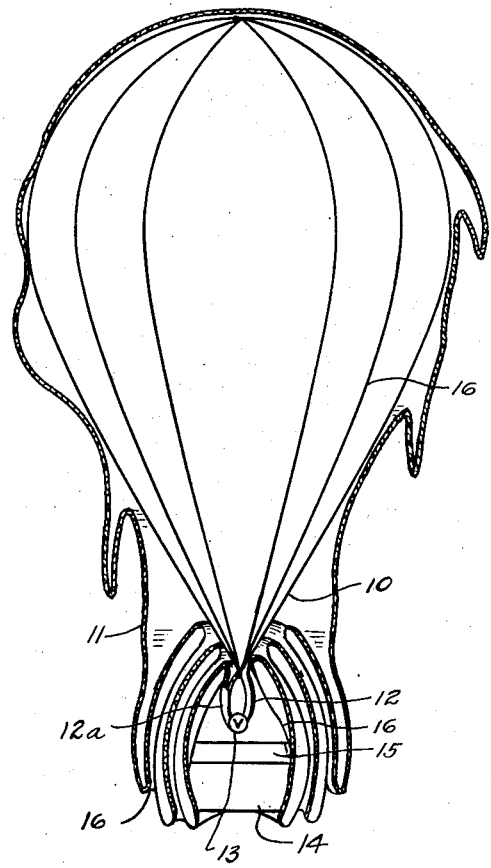
Fig. 1 is an elevational view partly in section showing the balloon assembly with the inner envelope fully inflated and the outer envelope deflated representing the condition of the unit just prior to launching.

With reference to the figures, a preferred embodiment of the new high altitude meteorological balloon is illustrated in Fig. 1 wherein an inner elastic balloon or envelope 10 shown in inflated form is contained substantially in its entirety within an outer elastic envelope 11 suspended thereover in a deflated condition. The envelopes may be fabricated of any suitable material such as rubber, specially treated fabrics or a synthetic resinous material such as polyethylene commonly used in the construction of high altitude balloons.

In order to provide for initially charging only the inner envelope while leaving the outer envelope substantially entirely collapsed preparatory to launching the balloon in accordance with the purpose of the present invention, any suitable balloon-within-balloon arrangement may be used making possible the aforesaid selective inflation and further providing for the transfer of a portion of the lifting gas from the inner to the outer envelope either by manual or automatic operation. In the embodiment shown in Fig. 1, these functions are made possible by connecting appendices 12 and 12(a) of the inner and outer envelopes respectively through a valve 13, said valve being either a 3-way stopcock adapted for manual control or a solenoid valve or its equivalent automatically operable by pressure changes in the atmosphere. The load unit designated generally as 14 including the meteorological instrumentation and parachute assembly 15 is advantageously close-coupled to the envelopes by shortening the load harness 16 connecting the load to each of the envelopes as far as possible to enable lifting the instruments clear of the ground at the time of launching.

Figure 2:
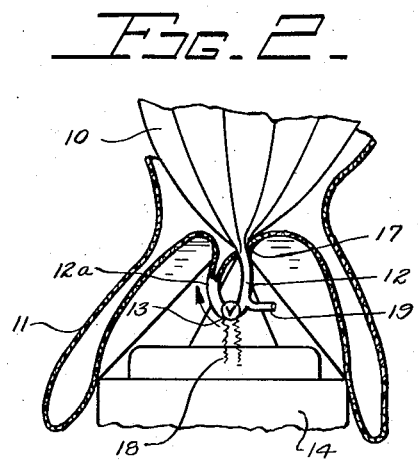
Fig. 2 is a slightly enlarged view partly in section of the basal portion of the balloon illustrating valve and connection details of a preferred embodiment of the invention.

In the related embodiment illustrated in Fig. 2, some of the structural aspects are shown in more detail. The common duct providing direct communciation between the envelopes is shown as formed by appendix 12 stemming from the base of the inner envelope, said appendix extending outwardly through an aperture within the wall of outer envelope 11. At this point a gas-tight seal 17 serves to prevent the leakage of lifting gas therethrough upon transfer of the same from the inner to the outer envelope. Supporting strands comprising a part of load harness 16 connecting load 14 to inner envelope 10 may also be passed through the same aperture without impairing the effectiveness of the seal. Associated with appendix 12 is valve 13 diagrammatically shown as a solenoid valve with electrical connections 18 for attachment to a suitable power source such as a battery comprising part of the instrumentation carried by the balloon. Appendix 12(a), comprising the terminal portion of the larger outer envelope, is similarly connected with the valve thereby providing the necessary communication between the envelopes when the valve is in an open or actuated position.

The amount of lifting gas sufficient for substantially fully inflating the inner envelope may be charged through valve 13 positioned to permit passage of the gas into the inner envelope utilizing, for example, a suitable 3-way stopcock adjusted to seal the opening to the outer envelope during the inflating operation. If desired, however, a separate inflating duct 19 associated with appendix 12 and directly communicating with the inner chamber of the inner envelope may be provided, said duct being tied off when the charging step has been completed. Upon charging the inner envelope to attain the condition represented in Fig. 1 wherein the outer envelope is distended in a deflated condition thereover the balloon is ready for release; the valve may either be opened manually in the case of the stopcock type, or it may be controlled by automatic operation in the case of a solenoid valve adjusted to open at any designated altitude responsive to atmospheric pressure changes. The direction of flow of the lifting gas from the inner envelope to the outer envelope occurring at the instant of launching and thereafter during ascent of the assembly is indicated by the arrow in Figs. 2 and 3. The gradual transfer of the lifting gas results in the ultimate inflation of the outer envelope surrounding the inner envelope permitting the balloon assembly to rise to higher altitudes with a resulting expansion of the lifting gas.

Fig. 3 diagrammatically illustrates the condition of the envelopes at a relatively high altitude wherein the inner envelope is in the process of gradually deflating and the larger outer envelope is almost completely inflated by transfer of the lifting gas through the common duct and valve thereby maintaining an equilibrium between the envelopes as the balloon ascends.

For facilitating the handling of the assembly particularly at the time of launching the unit with the large outer envelope in a deflated condition, it has been found feasible to position an apertured disc 20 or any comparable support at the base of the envelopes as indicated in Fig. 4 for collecting the folds of the outer envelope thereon to minimize risk of damage during the launching step. The disc providing a reasonably rigid support for the weight to be carried thereon should be light in weight and may be constructed of plastic, wood or metal such as aluminum; the aperture therethrough being of sufficient size to preclude the possibility of pinching the common duct formed by the appendices whereby the transfer of lifting gas between the envelopes may become restricted. Supporting tapes, or other means may be utilized for fastening the disc in the desired position.

It is an essential feature of my invention that the lifting gas within the inner elastic envelope be confined therein for a sufficient period of time to permti its full utilization during launching of the balloon assembly with the load comprising the meteorological instruments in a close-coupled relationship with the dual envelope structure. Once the balloon is launched, it is also essential that the initially charged lifting gas be permitted to escape into the outer envelope in its entirety with no appreciable loss thereof to the outside atmosphere until one or both envelopes are caused to burst when their elastic limit is exceeded at extremely high altitude. At this point, the parachute takes over permitting the landing of the instruments usually in a relatively undamaged condition.

While in the foregoing specification this invention has been described in relation to a preferred embodiment thereof and specific details of this embodiment have been set forth for the purpose of illustration, it will be apparent to those skilled in the art that this invention is susceptible to other embodiments and that many of the details herein set forth can be varied considerably without departing from the basic concept of the invention.

I claim:

1. A high altitude free-flying balloon comprising an outer elastic envelope, a comparatively small inner elastic envelope contained substantially wholly within said outer envelope, communication means arranged for permitting passage of a lifting gas between said envelopes, and a valve associated with said communication means operative to provide a seal between said envelopes to enable selective inflation of the inner envelope and thereafter to regulate the transfer of a portion of the charged gas from the inner to the outer envelope to establish an equilibrium condition therebetween.

2. A high altitude free-flying balloon comprising an elastic outer envelope, a relatively smaller elastic inner balloon contained substantially wholly within said outer envelope, a hollow duct connecting the envelopes and a solenoid valve associated with said duct operative to permit inflating of only the inner envelope with a lifting gas and thereafter controlling the passage of said gas from the inner to the outer envelope to establish pressure equilibrium therebetween responsive to changes in atmospheric pressure at increasing altitude.

3. An high altitude meteorological balloon comprising an elastic outer envelope, an elastic inner balloon surrounded by said outer envelope, an outwardly projecting appendix connecting said envelopes thereby providing communication therebetween, a seal for confining an initial charge of lifting gas to within the inner envelope only to substantially fully inflate the same and a valve associated with the appendix for transferring the lifting gas from the inner to the outer envelope.

4. A high altitude free-flying meteorological balloon comprising an outer elastic envelope, a relatively smaller elastic envelope contained substantially wholly within said outer envelope, means for independently inflating the inner envelope with a lifting gas, a valve associated with said envelopes for regulating the transfer of said gas from the inflated inner envelope to the outer envelope, and a close-coupled load connected to each of said envelopes, said load comprising the meteorological instruments and a parachute.

5. A high altitude free-flying meteorological balloon comprising an outer elastic envelope, a relatively smaller inner elastic envelope contained substantially wholly within said outer envelope, an outwardly projecting hollow duct connecting both envelopes and providing communication therebetween, a valve associated with said duct operative to permit inflating of the inner envelope only and thereafter regulating the transfer of a portion of the lifting gas from the inner to the outer envelope, and a disc positioned on said duct for supporting the uninflated portion of the outer envelope.

6. A high altitude free-flying meteorological balloon comprising a dual envelope system consisting of an inner elastic envelope and an outer elastic envelope, said envelopes adapted for confining a lifting gas, means for charging said inner envelope to inflate the same independently of the outer envelope and valve means operative to transfer the charged gas from the inner to the outer envelope.

7. A high altitude meteorological balloon construction adapted for launching without hazard to an attached instrument load, said balloon construction including a dual envelope having a large elastic outer envelope and a relatively smaller inner envelope wholly contained therein, said envelopes having a common appendix duct interconnecting the same, a valve means associated with said duct operative selectively to cut off and permit flow communication between said envelopes, means for close coupling an instrument load to each of said envelopes, means for initially inflating only the inner envelope with a quantity of lifting gas sufficient to provide the necessary buoyancy upon release to cause ascension of the composite assembly and attached load with the outer envelope in substantially wholly deflated condition and said valve being actuated during the launching thereof to provide for the transfer of lifting gas through said duct from the inner to the outer envelope to inflate the latter and to establish a pressure equilibrium therebetween with increasing altitude.

8. A high altitude meteorological balloon adapted to carry a load such as meteorological instruments to high altitudes comprising an outer elastic envelope and an internal elastic envelope forming a ballonet, means connected to both of said envelopes adapted to support a load, means for initially inflating only the inner envelope with a lifting gas in an amount sufficient to produce a lifting force capable of causing the balloon and the connected load to ascend to altitude and means for transferring gas from the internal envelope to the outer envelope to inflate the latter after the balloon is launched and becomes airborne.

References Cited in the file of this patent

UNITED STATES PATENTS

| | | |
|---|---|---|
| 1,300,640 | Pasternak | Apr. 15, 1919 |
| 2,753,133 | Melton | July 3, 1956 |

FOREIGN PATENTS

| | | |
|---|---|---|
| 1,318 | Great Britain | of 1892 |
| 214,122 | Germany | Oct. 8, 1909 |
| 740,158 | Great Britain | Nov. 9, 1955 |